US011109360B2

(12) United States Patent
Chang et al.

(10) Patent No.: US 11,109,360 B2
(45) Date of Patent: Aug. 31, 2021

(54) CHANNEL CONFIGURATION AND DL/UL CONFIGURATION FOR NB-IOT-U SYSTEM

(71) Applicant: Apple Inc., Cupertino, CA (US)

(72) Inventors: Wenting Chang, Beijing (CN);
Huaning Niu, Milpitas, CA (US);
Salvatore Talarico, Sunnyvale, CA (US); Rongrong Sun, Beijing (CN)

(73) Assignee: Apple Inc., Cupertino, CA (US)

( * ) Notice: Subject to any disclaimer, the term of this patent is extended or adjusted under 35 U.S.C. 154(b) by 63 days.

(21) Appl. No.: 16/267,810

(22) Filed: Feb. 5, 2019

(65) Prior Publication Data

US 2019/0174476 A1  Jun. 6, 2019

Related U.S. Application Data

(60) Provisional application No. 62/626,524, filed on Feb. 5, 2018.

(51) Int. Cl.
| | | |
|---|---|---|
| *H04W 72/04* | (2009.01) | |
| *H04W 72/00* | (2009.01) | |
| *H04W 56/00* | (2009.01) | |
| *H04L 29/08* | (2006.01) | |
| *H04W 88/02* | (2009.01) | |

(52) U.S. Cl.
CPC ......... *H04W 72/0406* (2013.01); *H04L 67/12* (2013.01); *H04W 56/001* (2013.01); *H04W 72/005* (2013.01); *H04W 72/0453* (2013.01); *H04W 88/02* (2013.01)

(58) Field of Classification Search
CPC ........... H04W 72/0406; H04W 56/001; H04W 72/005; H04W 72/0453; H04W 88/02; H04W 72/042; H04W 48/12; H04L 67/12; H04L 5/0012; H04L 5/0091; H04L 5/0053
See application file for complete search history.

(56) References Cited

U.S. PATENT DOCUMENTS

| | | | | |
|---|---|---|---|---|
| 2008/0043812 A1* | 2/2008 | Moffatt | ............... | H04L 27/2608 375/133 |
| 2012/0009923 A1* | 1/2012 | Chen | ..................... | H04L 5/0053 455/434 |
| 2012/0039180 A1* | 2/2012 | Kim | ...................... | H04L 5/0053 370/241 |
| 2012/0063351 A1* | 3/2012 | Kim | ....................... | H04L 5/001 370/252 |
| 2012/0307869 A1* | 12/2012 | Charbit | ............... | H04W 72/082 375/132 |

(Continued)

*Primary Examiner* — Gregory B Sefcheck
*Assistant Examiner* — Joshua Smith
(74) *Attorney, Agent, or Firm* — Kowert Hood Munyon Rankin and Goetzel PC

(57) ABSTRACT

An apparatus and method for frequency hopping in the unlicensed band are described. A NB-IoT UE receives a MIB from a RAN. The MIB includes a DL/UL configuration for communication with the RAN. Frequency hopping information is preconfigured in the UE. The MIB is received in an anchor segment of a fixed NB anchor channel in the unlicensed band. The frequency hopping sequence is determined based on timing information carried in a PBCH on the anchor channel. Data is communicated between the NB-IoT UE and the RAN in data segments on the data channels in accordance with the frequency hopping sequence.

20 Claims, 5 Drawing Sheets

(56) References Cited

U.S. PATENT DOCUMENTS

| | | | |
|---|---|---|---|
| 2013/0301490 A1* | 11/2013 | He | H04W 76/18 |
| | | | 370/280 |
| 2014/0071957 A1* | 3/2014 | Xu | H04W 4/80 |
| | | | 370/336 |
| 2016/0227582 A1* | 8/2016 | Vajapeyam | H04W 74/0833 |
| 2017/0134881 A1* | 5/2017 | Oh | H04W 56/001 |
| 2017/0288845 A1* | 10/2017 | Axmon | H04W 72/048 |
| 2018/0062699 A1* | 3/2018 | Horiuchi | H04L 5/0053 |
| 2018/0069593 A1* | 3/2018 | Yi | H04W 72/0446 |
| 2018/0097596 A1* | 4/2018 | Palanivelu | H04L 5/0048 |
| 2018/0124644 A1* | 5/2018 | Rico Alvarino | H04W 52/0209 |
| 2018/0124836 A1* | 5/2018 | Hong | H04W 74/008 |
| 2018/0287846 A1* | 10/2018 | Kim | H04L 5/0053 |
| 2019/0124699 A1* | 4/2019 | Yamada | H04W 74/0866 |
| 2019/0215815 A1* | 7/2019 | Blankenship | H04L 67/12 |
| 2019/0246371 A1* | 8/2019 | Hwang | H04W 4/80 |

* cited by examiner

CHANNEL CONFIGURATION AND DLUL CONFIGURATION FOR NB-IOT-U SYSTEM

PRIORITY CLAIM

This patent application claims the benefit of priority to U.S. Provisional Patent Application Ser. No. 62/626,524, filed on Feb. 5, 2018, which is hereby incorporated by reference herein in its entirety.

TECHNICAL FIELD

Embodiments pertain to radio access networks (RANs). Some embodiments relate to cellular and wireless local area network (WLAN) networks, including Third Generation Partnership Project Long Term Evolution (3GPP LTE) networks and LTE advanced (LTE-A) networks as well as legacy networks, $4^{th}$ generation (4G) networks and $5^{th}$ generation (5G) networks. Some embodiments relate to LTE operation in the unlicensed spectrum using MulteFire, specifically the Internet of Things (IoT) operating in the unlicensed spectrum.

BACKGROUND

The use of 3GPP systems has increased due to both an increase in the types of devices user equipment (UEs) using network resources as well as the amount of data and bandwidth being used by various applications, such as video streaming, operating on these UEs. In particular, typical UEs such as cell phones, as well as enhanced Machine Type Communication (eMTC) UEs and Narrowband Internet of Things (NB-IoT) UEs currently use 3GPP systems, which will soon be extended to 5G systems. The latter such UEs, may include sensors (e.g., sensing environmental conditions) or microcontrollers in appliances or vending machines. The number of eMTC UEs and NB-IoT UEs in use is expected to increase massively, thus leading to further network development in an attempt to accommodate for the disparate requirements of the different types of UEs and to increase throughput to the UEs. In particular, a number of developments have focused on the use of the unlicensed spectrum to provide additional communication channels with which the radio access networks (RANs) and UEs communicate.

BRIEF DESCRIPTION OF THE DRAWINGS

In the drawings, which are not necessarily drawn to scale, like numerals may describe similar components in different views. Like numerals having different letter suffixes may represent different instances of similar components. Some embodiments are illustrated by way of example, and not limitation, in the figures of the accompanying drawings in which.

DETAILED DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Figure 1:
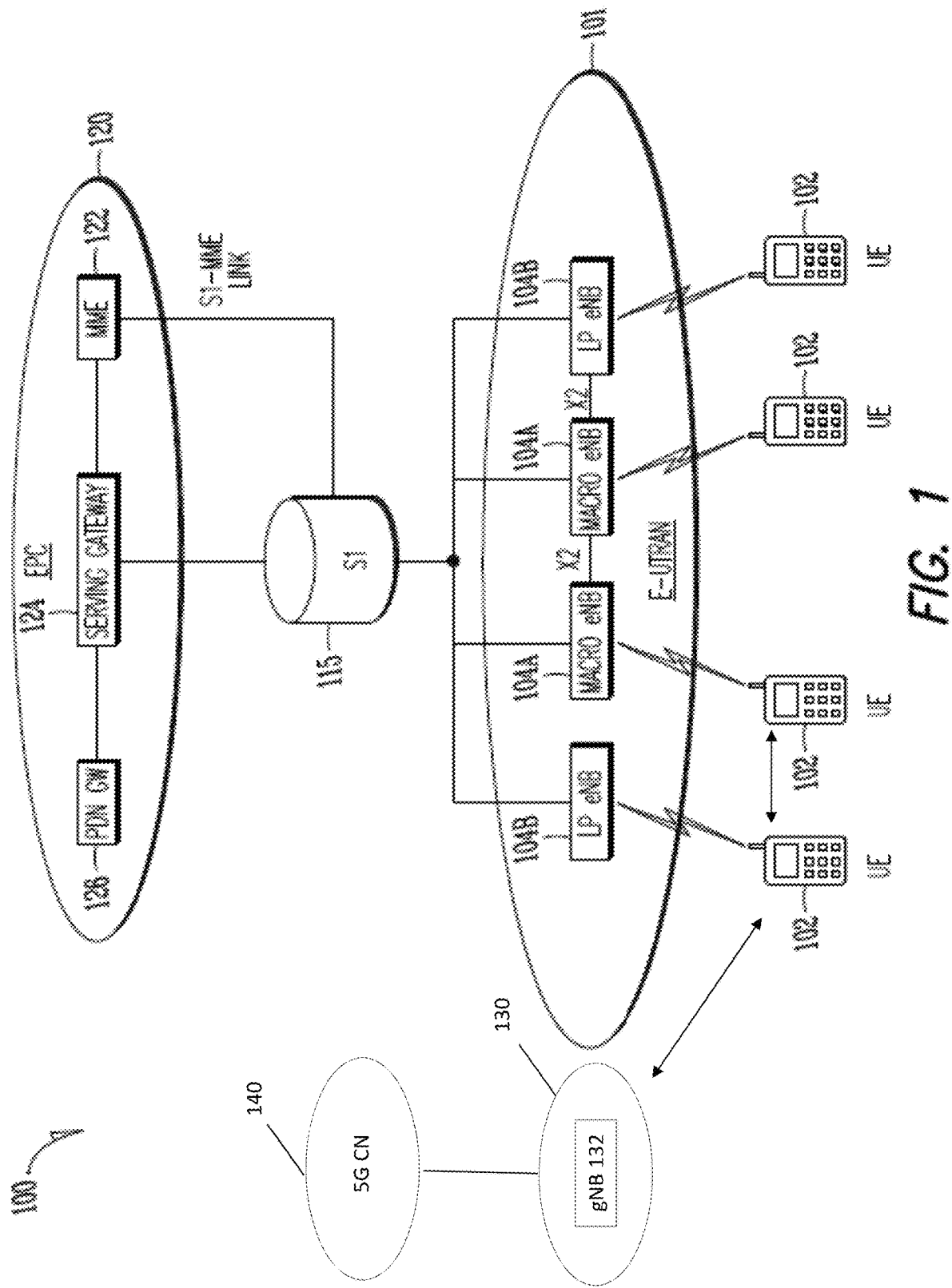
FIG. 1 shows an example of a network architecture in accordance with some embodiments.

FIG. 1 shows an example of a network architecture in accordance with some embodiments. As used herein, an LTE network refers to both LTE and LTE Advanced (LTE-A) networks as well as other versions of LTE networks to be developed. The network 100 may comprise a radio access network (RAN) (e.g., as depicted, the E-UTRAN or evolved universal terrestrial radio access network) 101 and core network 120 (e.g., shown as an evolved packet core (EPC)) coupled together through an S1 interface 115. For convenience and brevity, only a portion of the core network 120, as well as the RAN 101, is shown in the example. In addition to the RAN 101, the network 100 may include one or more next generation (NG) RANs 130 each containing one or more standalone gNBs 132 and connected to a 5G core network (5GC) 140 through a new radio (NR) air-interface.

The core network 120 may include a mobility management entity (MME) 122, serving gateway (SGW) 124, and packet data network gateway (PDN GW) 126. The RAN 101 may include evolved node Bs (eNBs) 104 (which may operate as base stations) for communicating with user equipment (UE) 102. The eNBs 104 may include macro eNBs 104a and low power (LP) eNBs 104b. Other elements, such as a Home Location Register (HLR)/Home Subscriber Server (HSS), a database including subscriber information of a 3GPP network that may perform configuration storage, identity management and user state storage, and a Policy and Charging Rule Function (PCRF) that performs policy decision for dynamically applying Quality of Service (QoS) and charging policy per service flow, are not shown for convenience. In some embodiments, the eNBs 104 may act as dual mode eNBs, providing LTE/4G and 5G service to the UEs 102. In some embodiments, the 5G RAN 130 may be a booster cell that is connected to an anchor RAN 101.

The MME 122 may be similar in function to the control plane of legacy Serving GPRS Support Nodes (SGSN). The MME 122 may manage mobility aspects in access such as gateway selection and tracking area list management, performing both mobility management (MM) and session management (SM). The Non-Access Stratum (NAS) is a part of the control plane between a UE 102 and the MME 122. The NAS is used for signaling between the UE 102 and the EPC in the LTE/UMTS protocol stack. The NAS supports UE mobility and session management for establishing and maintaining an IP connection between the UE 102 and PDN GW 126.

The serving GW 124 may terminate the user plane interface toward the RAN 101, and route data packets between the RAN 101 and the core network 120. In addition, the serving GW 124 may be a local mobility anchor point for inter-eNB handovers and also may provide an anchor for inter-3GPP mobility. Other responsibilities may include lawful intercept, charging, and policy enforcement, packet routing, idle mode packet buffering, and triggering an MME to page a UE. The serving GW 124 and the MME 122 may be implemented in one physical node or separate physical nodes.

The PDN GW 126 may terminate a SGi interface toward the packet data network (PDN). The PDN GW 126 may route data packets between the EPC 120 and the external PDN. The PDN GW 126 may perform policy enforcement and charging data collection UE IP address assignment, packet screening and filtering. The PDN GW 126 may also provide an anchor point for mobility devices with a non-LTE access. The external PDN can be any kind of IP network, as well as an IP Multimedia Subsystem (IMS) domain. The PDN GW 126 and the serving GW 124 may be implemented in a single physical node or separate physical nodes. In some embodiments, the 5G CN 140 may be connected with the EPC 120 through a Sha interface to an HSS of the EPC 120, and may or may not, in some embodiments, be connected through the PDN GW 126.

The eNBs 104 (macro and micro) may terminate the air interface protocol and may be the first point of contact for a UE 102. In some embodiments, an eNB 104 may fulfill various logical functions for the RAN 101 including, but not limited to, RNC (radio network controller functions) such as radio bearer management, uplink and downlink dynamic radio resource management and data packet scheduling, and mobility management. In accordance with embodiments, UEs 102 may be configured to communicate orthogonal frequency division multiplexed (OFDM) communication signals with an eNB 104 over a multicarrier communication channel in accordance with an OFDMA communication technique. The OFDM signals may comprise a plurality of orthogonal subcarriers. The UEs 102 may communicate with the RAN 101, the 5G RAN 130 and/or with each other (device-to-device (D2D) communication) via e.g., a Dedicated Short-Range Communications (DSRC) link. The DSRC standards suite is based on multiple cooperating standards that have been mainly developed by the IEEE and are based on the IEEE 802.11 standard.

The S1 interface 115 may be the interface that separates the RAN 101 and the EPC 120. It may be split into two parts: the S1-U, which may carry traffic data between the eNBs 104 and the serving GW 124, and the S1-MME, which may be a signaling interface between the eNBs 104 and the MME 122. The X2 interface may be the interface between eNBs 104. The X2 interface may comprise two parts, the X2-C and X2-U. The X2-C may be the control plane interface between the eNBs 104, while the X2-U may be the user plane interface between the eNBs 104.

With cellular networks, LP cells 104b may be typically used to extend coverage to indoor areas where outdoor signals do not reach well, or to add network capacity in areas with dense usage. In particular, it may be desirable to enhance the coverage of a wireless communication system using cells of different sizes, macrocells, microcells, picocells, and femtocells, to boost system performance. The cells of different sizes may operate on the same frequency band, or the cells may operate on different frequency bands with each cell operating in a different frequency band or only cells of different sizes operating on different frequency bands. As used herein, the term LP eNB refers to any suitable relatively LP eNB for implementing a smaller cell (smaller than a macro cell) such as a femtocell, a picocell, or a microcell.

Femtocell eNBs may be typically provided by a mobile network operator to its residential or enterprise customers. A femtocell may be typically the size of a residential gateway or smaller and generally connect to a broadband line. The femtocell may connect to the mobile operator's mobile network and provide extra coverage in a range of typically 30 to 50 meters. Thus, a LP eNB 104b might be a femtocell eNB. In some embodiments, when the LP eNB 104b is a Home eNB (HeNB), a HeNB Gateway may be provided between the HeNB and the MME/Service Gateway. This HeNB Gateway may control multiple HeNBs and provide user data and signal traffic from the HeNBs towards the MIME/Service Gateway. Similarly, a picocell may be a wireless communication system typically covering a small area, such as in-building (offices, shopping malls, train stations, etc.), or more recently in-aircraft. A picocell eNB may generally connect through the X2 link to another eNB such as a macro eNB through its base station controller (BSC) functionality and/or connect via an S1 interface to an MME/Service Gateway. Thus, LP eNB may be implemented with a picocell eNB since it may be coupled to a macro eNB 104a via an X2 interface. Picocell eNBs or other LP eNBs LP eNB 104b may incorporate some or all functionality of a macro eNB LP eNB 104a. In some cases, this may be referred to as an access point base station or enterprise femtocell.

Figure 2:
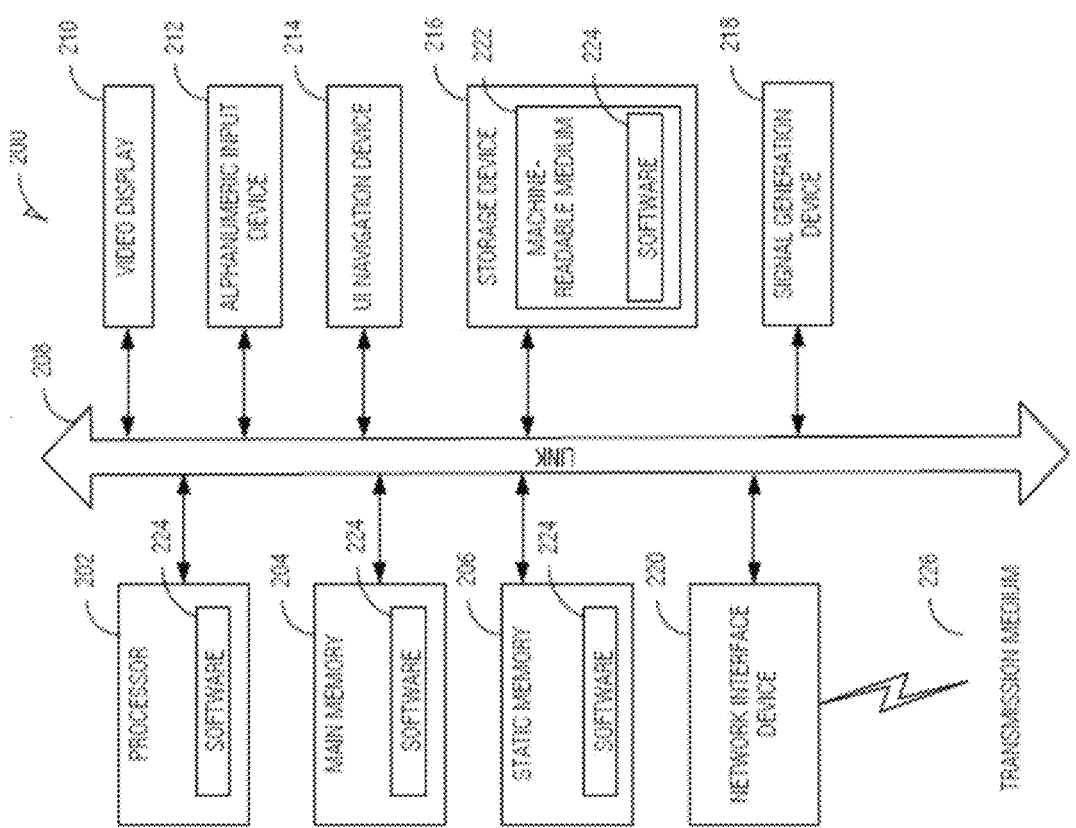
FIG. 2 illustrates a block diagram of a device in accordance with some embodiments.

FIG. 2 illustrates a block diagram of a device in accordance with some embodiments. The device may be a UE, eNB, or gNB, among others. The device 200 may include, or may operate on, logic or a number of components, modules, or mechanisms. Modules and components are tangible entities (e.g., hardware) capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine readable medium. In an example, the software, when executed by the underlying hardware of the module, causes the hardware to perform the specified operations.

Accordingly, the term "module" (and "component") is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor may be configured as respective different modules at different times. Software may accordingly configure a hardware processor, for example, to constitute a particular module at one instance of time and to constitute a different module at a different instance of time.

The device 200 may include a hardware processor 202 (e.g., a central processing unit (CPU), a GPU, a hardware processor core, or any combination thereof), a main memory 204 and a static memory 206, some or all of which may communicate with each other via an interlink (e.g., bus) 208. The main memory 204 may contain any or all of removable storage and non-removable storage, volatile memory or non-volatile memory. The device 200 may further include a display unit 210 such as a video display, an alphanumeric input device 212 (e.g., a keyboard), and a user interface (UI) navigation device 214 (e.g., a mouse). In an example, the display unit 210, input device 212 and UI navigation device 214 may be a touch screen display. The communication device 200 may additionally include a storage device (e.g., drive unit) 216, a signal generation device 218 (e.g., a speaker), a network interface device 220, and one or more sensors, such as a global positioning system (GPS) sensor, compass, accelerometer, or other sensor. The device 200 may further include an output controller, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 216 may include a non-transitory machine readable medium 222 (hereinafter simply referred to as machine readable medium) on which is stored one or more sets of data structures or instructions 224 (e.g., software) embodying or utilized by any one or more of the techniques or functions described herein. The instructions 224 may also reside, completely or at least partially, within the main memory 204, within static memory 206, and/or within the hardware processor 202 during execution thereof by the communication device 200. While the machine readable medium 222 is illustrated as a single medium, the term "machine readable medium" may include a single medium or multiple media (e.g., a centralized or distributed database, and/or associated caches and servers) configured to store the one or more instructions 224.

The term "machine readable medium" may include any medium that is capable of storing, encoding, or carrying instructions for execution by the device 200 and that cause the device 200 to perform any one or more of the techniques of the present disclosure, or that is capable of storing, encoding or carrying data structures used by or associated with such instructions. Non-limiting machine readable medium examples may include solid-state memories, and optical and magnetic media. Specific examples of machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Random Access Memory (RAM); and CD-ROM and DVD-ROM disks.

The instructions 224 may further be transmitted or received over a communications network using a transmission medium 226 via the network interface device 220 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks. Communications over the networks may include one or more different protocols, such as Institute of Electrical and Electronics Engineers (IEEE) 802.11 family of standards known as Wi-Fi, IEEE 802.16 family of standards known as WiMax, IEEE 802.15.4 family of standards, a LTE family of standards, a Universal Mobile Telecommunications System (UMTS) family of standards, peer-to-peer (P2P) networks, or a NG standard among others. In an example, the network interface device 220 may include one or more physical jacks (e.g., Ethernet, coaxial, or phone jacks) or one or more antennas to connect to the transmission medium 226.

IoT may enable connectivity between a large number of devices. IoT has a wide variety of applications in various scenarios, including smart cities, smart environment, smart agriculture, and smart health systems. 3GPP has standardized two designs to support IoT services, as above eMTC and NB-IoT. As eMTC and NB-IoT UEs are likely to be deployed in huge numbers, lowering the cost of these UEs is an enabler for implementation of IoT. In addition, low power consumption is desirable to extend the life time of the battery in such devices. In addition, there are substantial use cases of devices deployed deep inside buildings, thereby using coverage enhancement in comparison to the defined LTE cell coverage footprint. eMTC, and NB-IoT techniques are designed to ensure that the UEs have low cost, low power consumption, and enhanced coverage.

As above, UEs, including eMTC and NB-IoT UEs, may operate in the licensed spectrum. However, the scarcity of licensed spectrum may result in insufficient bandwidth for UE use, especially due to the advent of 5G communications, leading to a reduction in data rate. This has caused interest in communication using the unlicensed spectrum including Carrier Aggregation (CA) based on Licensed Assisted Access (LAA)/enhanced LAA (eLAA) systems, LTE operation in the unlicensed spectrum via dual connectivity (DC), and standalone LTE systems in the unlicensed spectrum. In the latter of these, called MulteFire, LTE-based technology may operate solely in unlicensed spectrum without use of an anchor in licensed spectrum.

To extend the benefits of LTE IoT designs into unlicensed spectrum, MulteFire is expected to specify the design for Unlicensed-IoT (U-IoT or UIoT). U-IoT may refer to the operation of IoT devices in the unlicensed spectrum. Various embodiments discussed herein are related to U-IoT systems, and in particular, may be related to eMTC-based U-IoT designs. Similar approaches may be applied to NB-IoT-based U-IoT designs as well as eMTC-based U-IoT designs.

MulteFire and other unlicensed band techniques can be used in any unlicensed spectrum. MulteFire deployments are expected in the 5 GHz and 2.4 GHz unlicensed band and potentially also in the 3.5 GHz shared band in the United States. In a MulteFire network, eNBs and/or access points (APs) communicate solely in an unlicensed radio frequency spectrum band. This is different from LAA/LWA and other systems in which a channel in a licensed (LTE) frequency acts as an anchor channel to provide control information. Use of the unlicensed spectrum may impose transmission power limitations and protocols such as Clear Channel Assessment (CCA) and Listen-Before-Talk (LBT) transmission rules if the channel is occupied.

When using the unlicensed bands, RAN nodes (eNB, gNB) and UEs may determine channel availability via energy detection before transmitting data on the channel. For example, the RAN node or UE may determine that the channel is occupied through a predetermined amount of energy being present in the channel or via a change in a received signal strength indication (RSSI). The RAN node or UE may detect the presence of a specific sequence, such as a preamble transmitted prior to a data transmission, that indicates use of the channel.

The unlicensed channel may be reserved using a reservation signal to prevent WiFi signals from initiating transmission until the next frame boundary event. Thus, the RAN node and UEs may contend for access to the unlicensed frequency band by performing CCA procedures, and transmitting during transmission opportunities (TxOPs).

In some embodiments, the unlicensed frequency band of interest may be in the 2.4 GHz band. For global availability, the design may abide by the regulations in different regions (e.g., the regulations given by Federal Communications Commission (FCC) in the United States and the regulations given by European Telecommunications Standards Institute (ETSI) in Europe). Based on these regulations, frequency hopping is more appropriate than other forms of modulation, due to more relaxed power spectrum density (PSD) limitations and co-existence with other unlicensed band technologies, such as Bluetooth and WiFi. Specifically, frequency hopping (intra- or inter-subframe) may have no PSD limit, while other wideband modulations may have a PSD limit of 10 dBm/MHz in regulations given by ETSI. A low PSD limit may result in more limited coverage for the eNB.

Based upon the latest agreements related to the eMTC-U system, the periodicity target band for NB-IoT are sub-1 GHz in the US, EU and China. Regulation defines the operation of such as a system as either digital modulation or frequency hopping. Digital modulation requires a system BW that is greater than 500 KHz with PSD limitation of 8 dBm/3 kHz. Frequency hopping, instead, has limitations on the duty cycle and the number of hops. Different numbers of hops result in different maximum transmission powers. In the European Union (EU), for sub-1 GHz, four new sub-channels have been proposed to be used and the proposal has been drafted in the EC. These sub-channels are: 865.6 MHz-865.8 MHz, 866.2 MHz-866.4 MHz, 866.8 MHz-867.0 MHz, 867.4 MHz-867.6 MHz. In the EU, the regulation regarding these sub-channels states that: 1) maximum Effective Isotropic Radiated Power (EIRP) is 27 dBm; 2) adaptive power control is required; 3) bandwidth is smaller than 200 kHz; and 4) the duty cycle for network access points (APs) is smaller than 10%, otherwise this is 2.5% for other types of equipment. In the US, there are two types of regulations: one for Frequency-Hopping Spread Spectrum (FHSS) and one for digital modulation.

In industrial IoT applications, a number of UEs exist with divergent requirements; some UEs may have a cost limitation with low data rate and low latency, while other UEs may have a relatively high data rate requirement with a tolerable cost consideration. To support these divergent types of UEs with divergent service, a work item with hybrid licensed NB-IoT has been agreed upon. To satisfy the existing regulations, frequency hopping is used, in particular in US regions. However, the use of frequency hopping introduces uncertainty as to the use of various bands. To solve the uncertainty caused by frequency hopping, frequency hopping may be indicated so that the RAN node and UE can transmit/receive using the same channel.

The frequency hopping indication for the NB-IoT-U system is described herein. In the legacy NB-IoT system, communication may be based on a Frequency Division Duplex (FDD) and Half-Duplex (HD)-FDD system, while due to the regulation limitation, the current system may be similar to a Time Division Duplex (TDD) system. The DL and UL configuration may also consider regulation of different regions for the NB-IoT UE operating in unlicensed spectrum as well as frequency hopping. The anchor channel may be provided in the unlicensed band and may use a fixed frequency—i.e., the anchor channel may be the same over time, even though the data channels engage in frequency hopping. The anchor channel may be used to transmit the frequency hopping sequence and/or UL/DL configuration, rather than this information be indicated in a downlink control information (DCI) format of the control information.

Figure 3:
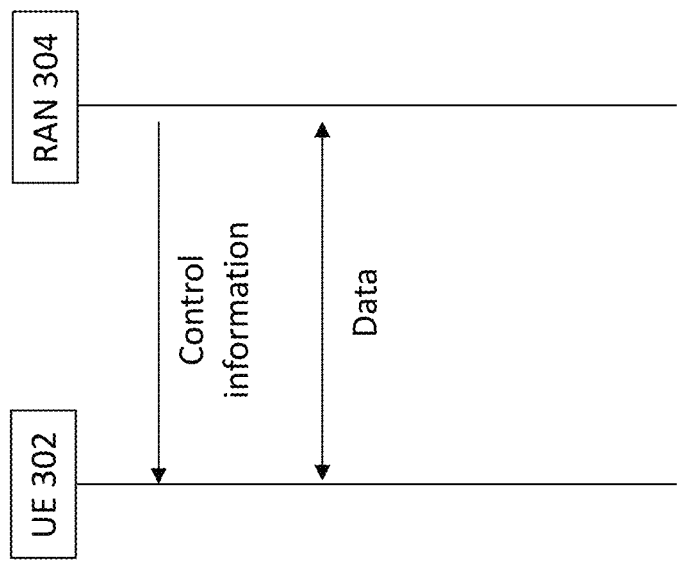
FIG. 3 illustrates communication to enable frequency hopping in accordance with some embodiments.

FIG. 3 illustrates communication to enable frequency hopping in accordance with some embodiments. FIG. 3 illustrates the transmission of control information from the RAN 304 to the UE 302 to be used for frequency hopping. The frequency hopping information (e.g., equation) may be preconfigured in the UE 302, with the timing information provided in a narrowband physical broadcast channel (NPBCH). The UL/DL configuration may be provided in a Master Information Block (MIB) transmitted in the anchor channel. After the UL/DL configuration has been received by the UE 302, the RAN 304 to the UE 302 can communicate data and/or control information in the unlicensed band using the frequency hopping information and the UL/DL configuration.

In some embodiments, the bandwidth of the system used by the NB-IoT UE can be divided into N orthogonal groups, where N is an integer. If N=1 (i.e., one group), all channels may be utilized for frequency hopping. In this case, the number of channels used may depend on the geographical region in which the NB-IoT UE is located, e.g., the 130 channels for US and 5 channels for EU can be utilized for frequency hopping.

If N=2 (i.e., two groups), each group may contain at least 50 channels, for example, including an anchor channel (through which initial association occurs) and data channels. In this case, 1 bit in the MIB may be used to indicate the channel whitelist.

If N=4 or 5 (i.e., four or five groups), each group may contain 25 channels, including an anchor channel or data channels. In this case, four or five bitmaps can be configured in the MIB to indicate the channel whitelist. Alternatively, $\lceil \log 2(C_{N_{CH}}^{N_d}) \rceil$ bits may be used for the channel whitelist, where $N_d$ is the configured group number, e.g. 1 or 2 for 25 or 50 channels, respectively, $N_{CH}$ is the total number of group number, e.g. 4 or 5. An example is illustrated in the Table 1, which provides an example of bit number for channel whitelist configuration, where $N_d$=1 and 2 represent 25 and 50 channels are respectively adopted for frequency hopping.

TABLE 1

|  | $N_{CH}$ = 4 | $N_{CH}$ = 5 |
| --- | --- | --- |
| $N_d$ = 1 | 2 | 3 |
| $N_d$ = 2 | 3 | 4 |

In some embodiments, the channel white list can jointly indicate the channel number and channel groups. Table 2 provides an example of joint channel whitelist and channel number indication.

TABLE 2

| One state | All channels |
| --- | --- |
| two states | two groups, while one state corresponds to one group |
| Four~ten states | Four or five groups, while each group corresponds to one group combination |

In some embodiments, one state can be utilized to indicate that no frequency hopping is to be used. For instance, in the EU, when frequency hopping is not used, the UE may transmit and receive on the channel where the UE received the narrowband primary synchronization signal (NPSS)/secondary synchronization signal (NSSS)/physical broadcast channel (NPBCH) for initial access. In some ETSI embodiments, the anchor channel may be band 54 (869.4-869.65 MHz), which contains at least the NPSS, NSSS, NPBCH, and possibly SIB1. Other 200 kHz frequency channels may be added and signaled by the eNB when and where available.

In some embodiments, multiple anchor channels may be supported. In this case, each anchor channel may indicate its own channel group. The channels in each channel groups may be unique.

In some embodiments, the whitelist can be indicated using one of a number of options. In a first option, the bitmap is utilized, where each bit corresponds to a specific channel.

In this case, "1" means this channel has been chosen, and "0" indicates that this channel will be not chosen. In a second option, given all the permutations of the available channels $N_{CH}$ in group of Nd channels $\lceil \log 2(C_{N_{CH}}^{N_d}) \rceil$, an indication of the index can be provided. In a third option, to reduce the size for the channel whitelist indication, $N_{group}$ channels can be grouped. Then $\lceil \log 2(C_{\lceil N_{CH}/N_{group}\rceil}^{N_d}) \rceil$ bits are used to select one of the groups, and $\lceil \log 2(N_{group}) \rceil$ is used to select a specific channel.

In a fourth option, to reduce the size for channel whitelist indication, $N_{group}$ channels can be grouped. If a group is chosen, all the channels within that group are also chosen. If the number of data channels exceed the channel Nd number, only part of those channels will be used. Either the large or small channel indexes in the first or last group can be dropped.

In a fifth option, to reduce the size for the channel whitelist, $N_{group}$ groups of channels may be formed, and for each group a permutation of the groups over channels may be performed over groups of $N_d$ channels. In this case, $\lceil \log 2(N_{group}) \rceil$ is used to select the sequence of a specific group, and $\lceil \log 2(C_{N_d}^{\lceil N_{CH}/N_{group}\rceil}) \rceil$ is used to identify a specific sequence within a group.

In a sixth option, multiple anchor channels are supported, and each anchor channel has a set of channels. Given a set of channels that has a unique an anchor channel, any of options 1-5 described above can be used to provide indication of the whitelist for each of this reduced set of channels.

In some embodiments, to further reduce the overhead, the indication for channel group selection in the third, fourth and fifth options above can be further reduced. To accomplish this, contiguous or equidistant channel groups may be selected. The selected groups may be composed of channels that have a particular structure and two adjacent channels may be within M channels from each other (i.e., relatively close to each other). In this case, the whitelist can indicate only a specific sequence within a much more reduced set of channels. Once M is defined, an approach similar to the third or fifth option can be used to signal the specific sequence throughout a whitelist.

In some embodiments, for the sixth option the signaling overhead can be further reduced by adopting a similar approach of that described above. This is to say that the set of channels for each anchor channel are determined such that the channels are contiguous. Then, once the set of channels for each anchor channel is set, the group may be defined such that the channels within the group have particular structure and two adjacent channels are within M channels from each other. Through this approach, multiple combinations may not be allowed, and the number of allowed sequences may be drastically reduced.

In some embodiments, the whitelist can be indicated using different options. In a first option, a bitmap is utilized, where each bit corresponding to a specific channel. In this option, for example "1" means this channel has been chosen, and "0" indicates that this channel will be not chosen. In a second option, given all the permutations of the available channels $N_{CH}$ in group of Nd channels $\lceil \log 2(C_{N_{CH}}^{N_d}) \rceil$, the indication of the index can be provided.

In a third option, to reduce the size for the channel whitelist indication, $N_{group}$ channels can be grouped. Then $\lceil \log 2(C_{\lceil N_{CH}/N_{group}\rceil}^{N_d}) \rceil$ bits may be used to select one of the groups, and $\lceil \log 2(N_{group}) \rceil$ may be used to select a specific channel.

In a fourth option, to reduce the size for channel whitelist indication, $N_{group}$ channels can be grouped. If a group is chosen, all the channels within that group are also chosen. If the number of data channels exceed the channel Nd number, only part of those channels will be used. Either the large or small channel indexes in the first or last group can be dropped.

In a fifth option, to reduce the size for channel whitelist indication, $N_{group}$ group of channels is formed. A permutation of each group of channels is performed over groups of $N_d$ channels. Then, $\lceil \log 2(N_{group}) \rceil$ is used to select the sequence of a specific group, and $\lceil \log 2(C_{N_d}^{\lceil N_{CH}/N_{group}\rceil}) \rceil$ is used to identify a specific sequence within a group.

In a sixth option, multiple anchor channels may be supported. Each anchor channel may have a set of channels. Given a set of channels that is specific for an anchor channel, any of the first-fifth options described above can be used to provide indication of the whitelist for each of this reduced set of channels.

In some embodiments, to further reduce the overhead, the indication for channel group selection in the third, fourth or fifth option can be further reduced similar to the above. That is, contiguous or equidistant channel groups are selected. The groups may be composed of channels that have a particular structure and two adjacent channels may be within M channels from each other. In this case, the whitelist may indicate only a specific sequence within a much more reduced set of channels. Once M is defined, an approach similar to the third or fifth option 3 or 5 can be used to signal the specific sequence throughout a whitelist.

In some embodiments, for the sixth option the signaling overhead can be further reduced by adopting a similar approach to that described above. This is to say that the set of channels for each anchor channel are determined such that the channels are contiguous. Then, once the set of channels for each anchor channel is set, the group may be defined such that the channels within the group have particular structure and two adjacent channels are within M channels from each other. Through this approach, multiple combinations may not be allowed, and the number of allowed sequences may be drastically reduced.

The hopping sequence for a NB-IoT UE may be generated as a concatenation of two length-32 sequences generated in a manner similar to that of a eMTC-U.

Separate Anchor and Data Channels

In some embodiments, the physical channels index for anchor channels and the data channels can be pre-defined separately. Thus, the anchor channel may be a fixed channel (e.g., on which the NPSS/NSSS/NPBCH are carried for initial connection). In some embodiments, the channels can be dedicatedly reserved, that is: 30 channels may be dedicated for anchor channel transmission or 5 channels may be dedicated for anchor channel transmission.

When 30 channels are dedicated for anchor channel transmission, in some embodiments, two groups may be used, where each group contains 50 channels, for data channels. Two bitmaps can be utilized to indicate the channel whitelist. Alternatively, 1 bit may be used in the MIB to indicate which group is used, e.g. "0" for the first group and "1" for the second group. In some embodiments, four groups may be used, where each group contains 25 channels, for data transmission. Four bitmaps can be utilized to indicate the channel whitelist. Alternatively, two-three bits may be used to indicate the channel whitelist. A joint indicator can be utilized to indicate the group number and the channel whitelist information.

When 5 channels are dedicated for anchor channel transmission, the remaining channels can be utilized for data channel division, e.g. 5 groups, with each data channel group containing 25 channels. In some embodiments, two groups may be used, where each group contains 50 channels, for data channels. Two bitmaps can be utilized to indicate the channel whitelist. Alternatively, 1 bit may be used in the MIB to indicate which group is used, e.g. "0" for the first group and "1" for the second group.

In some embodiments, five groups may be used, where each group contains 25 channels, for data transmission. A five-bit length bitmap can be utilized to indicate the channel whitelist. Alternatively, three-four bits may be used to indicate the channel whitelist. As above, a joint indicator can be utilized to indicate the group number and the channel whitelist information.

Figure 4:
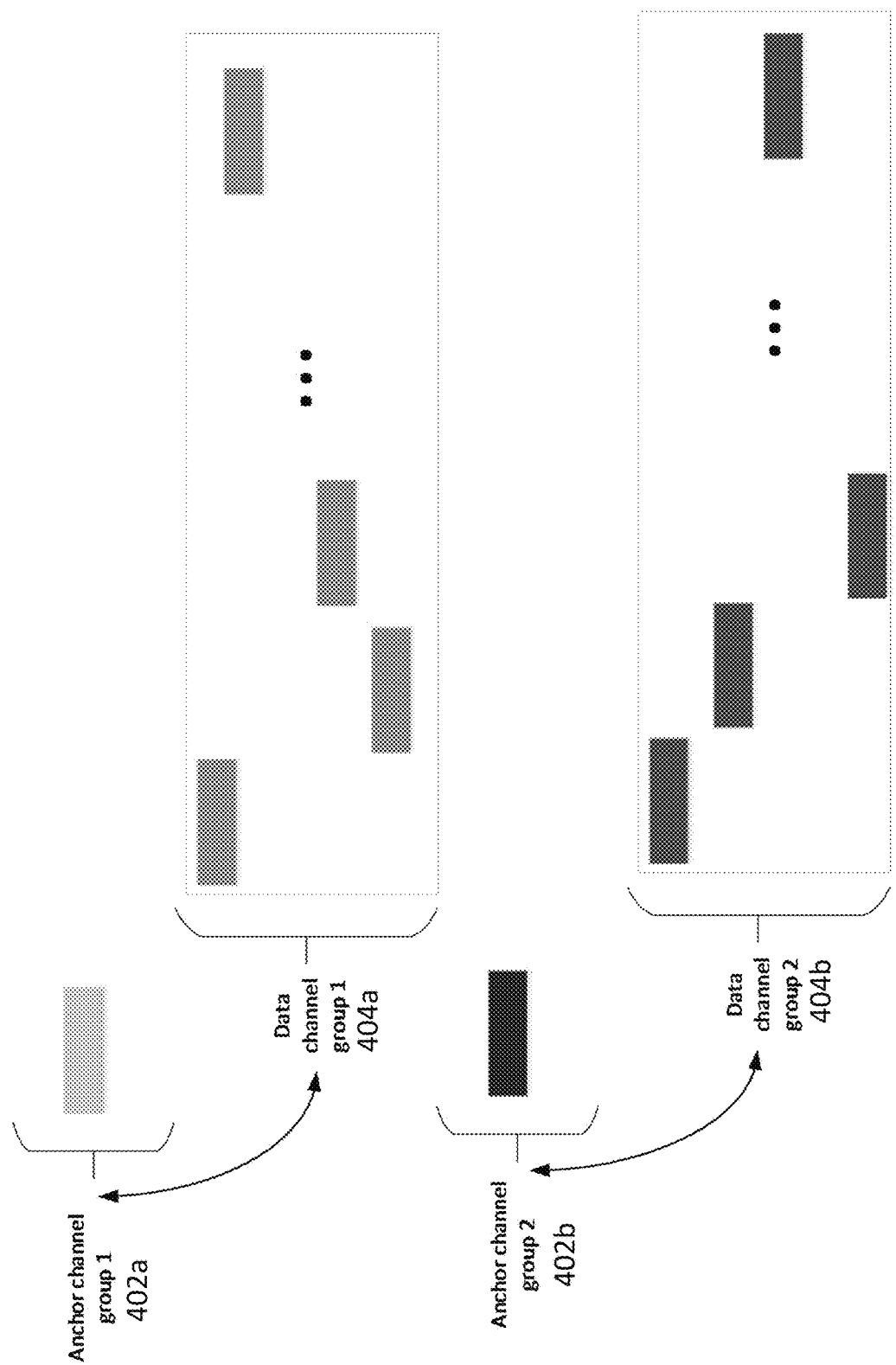
FIG. 4 illustrates channel association in accordance with some embodiments.

In some embodiments, the physical channel index can be associated with the data groups. FIG. 4 illustrates channel association in accordance with some embodiments. As illustrated FIG. 4, the anchor channels 402 may be divided into several orthogonal groups 402a, 402b. Each anchor group 402a, 402b may be associated with one data channel group 404a, 404b. In some embodiments, when the anchor channel of one of the anchor groups 402a, 402b is detected, the associated data channel group 404a, 404b may be adopted implicitly. Each anchor channel group 402a, 402b can contain a single anchor channel or may contain multiple anchor channels. If an anchor channel group 402a, 402b contains multiple anchor channels, the anchor channel for association may be the channel that carries NPSS/NSSS/NPBCH, which is utilized for initial access.

In some embodiments, the channel can be divided into 7 or 8 groups, with each group containing 16 channels. In this case, a 7 or 8 bit length bitmap can be configured in the MIB. Alternatively, the combinatorial index can be utilized to indicate the channel whitelist. For 7/8 groups, 6/7 bits may be used. In some embodiments, the channel whitelist bitfield can be re-interpreted dependent on the geographical location of the UE, since the US and EU can be distinguished by the different physical frequency of the anchor channel. In some embodiments, no whitelist may be used—instead multiple (e.g., three) anchor channels may be used and the remaining bandwidth divided to 64 hopping (data) channels. In some embodiments, the anchor and data channels may be of different sizes, e.g., 3 200 kHz (600 kHz) anchor channels and 345 kHz data channels (leaving a guard band 1060 kHz on each side). Under FCC regulations, the NB-IoT-U channel separation may be 300 kHz and the number of hopping frequencies greater than or equal to 50.

DL/UL Configuration

Figure 5:
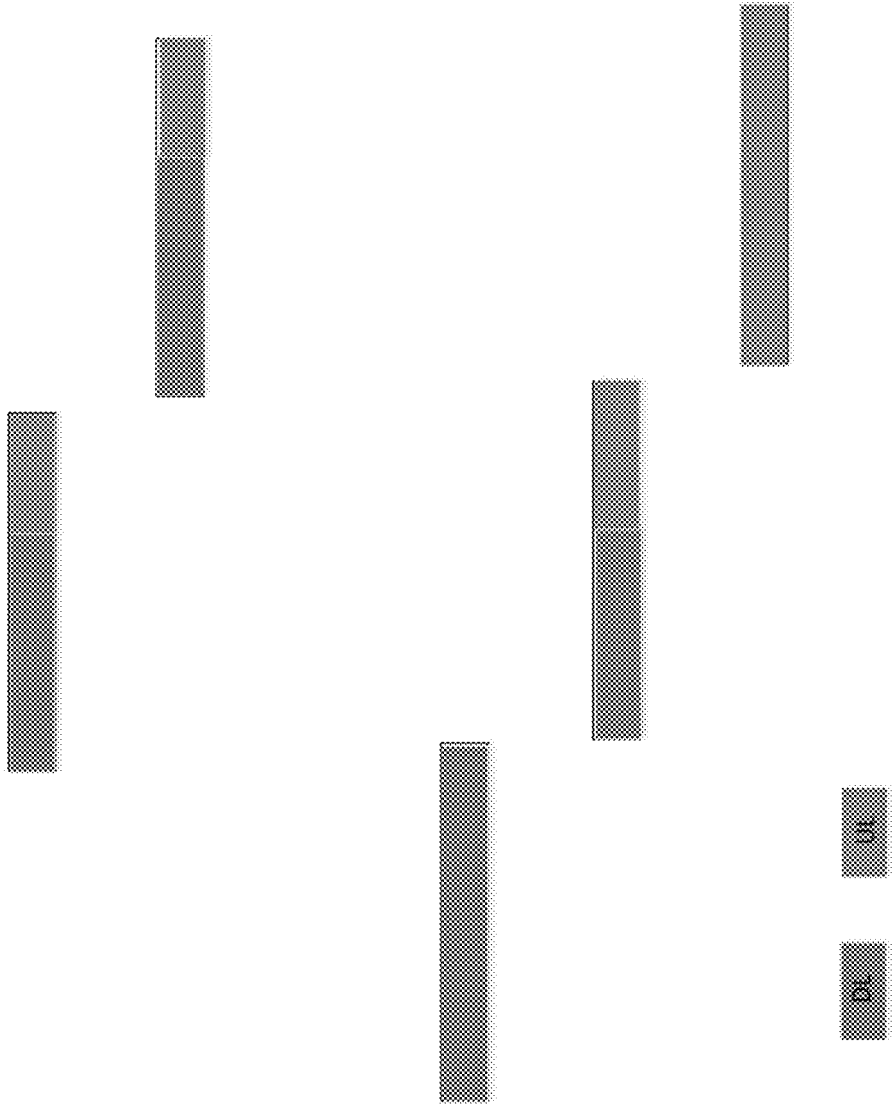
FIG. 5 illustrates a downlink/uplink configuration in accordance with some embodiments.

FIG. 5 illustrates a downlink/uplink configuration in accordance with some embodiments. In some embodiments, the DL and UL configuration 502a, 502b can be configured in the MIB or one of the system information blocks (SIBs). In some embodiments, the DL/UL configuration 502a, 502b can be configured per channel dwell, as illustrated in the example (a) of FIG. 5. In some embodiments, as the ratio of the DL and UL resources may be configured, the configuration may be irrespective of the channel dwell timing, since different regions may have different dwell times. The DL/UL ratio can leverage the current LTE TDD DL and UL ratio. Alternatively, the LTE TDD DL and UL subframe can be applied and repeated until the ending of the dwell time. Multiple DL/UL switches may be supported, similar to the legacy TDD system.

In the NB-IoT system, one RACH transmission without repetition may occupy 6.4 ms. With repetition, the RACH transmission may use more contiguous UL subframes. The DL/UL configuration can span multiple channels, as illustrated in example (b) of FIG. 5. In this case, the length of one DL/UL configuration can be configured by the eNB or pre-defined. In some embodiments, the eMTC-U configuration may be reused. The DL/UL configuration between two anchor channels may contain multiple data channels. The DL/UL configuration can be configured for each burst of consecutive data channels or individually for each channel of the burst. In some embodiments, the DL/UL configuration can be semi-persistent, and the periodicity can be fixed or configured through higher layer signaling.

In some embodiments, the DL/UL configuration can be indicated by the MIB or one of the SIBs. If the MIB is used, a 3 or 4 bit indicator can be adopted considering the capacity limitation of MIB. If a SIB is used, either bitmap or 3-4 bit indicator can be utilized. In some embodiments, the DL/UL configuration can cross one or two or channel dwell. The length may be 20, 40 or 80 SF, for example. For example, a 3 bit indicator may indicate 8 possible DL/UL configurations, such as 20 DL+20 UL; 10 DL+30 UL; 8 DL+72 UL; 60 DL+20 UL; 40 DL+40 UL; 30 DL+50 UL; 20 DL+60 UL; 10 DL+70 UL. For the EU, in which the special subframe is in the UL dwell, possible DL/UL configurations may include 8 DL+72 UL; 4 DL+36 UL; 2 DL+18 UL; 4 DL+16 UL; 8 DL+32 UL; 8 DL+12 UL; 16 DL+64 UL; 3 DL+7 UL. For the US, in which the special subframe is in the DL dwell, possible DL/UL configurations may include 10 DL+10 UL; 4 DL+6 UL+4 DL+6 UL; 6 DL+14 UL; 8 DL+12 UL; 12 DL+8 UL; 0 DL+20 UL; 3 DL+7 UL+3 DL+7 UL; 2 DL+8 UL+2 DL+8 UL.

The anchor channel may be selected by the NB-IoT UE from a list of candidate anchor channels. The information on the anchor channel may be transmitted in an anchor segment during each set of narrowband frames (nframes), each of which may be 2, 4, or 8 radio frames (e.g., 20 ms). The timing of the anchor segment transmission may depend on the frame structure used, although in each type of frame structure, the anchor segment may be transmitted at the beginning of the period (before the data segment times) to enable the UE to determine the hopping pattern and communicate data during the data segments. Frame structures with different DRS periods ($T_{DRS}$) may be used, where $T_{DRS}$=8 radio frames for frame structure type 3N1 and $T_{DRS}$=128 radio frames for frame structure type 3N2. A DRS period may thus be partitioned into the anchor segment and data segment, where the DRS is included in the anchor segment. The anchor segment may consist of two radio frames and start at radio frames satisfying $n_f$ mod $T_{DRS}$=0. The data segment may consist of the remaining $T_{DRS}$-2 radio frames. The anchor segment on each nframe may always be transmitted on the selected channel. Data segments may be transmitted in different data channels as specified by the hopping pattern after transmission of the anchor segment. Data transmission in each nframe may be different—i.e., different data channels or the order of the data channels may be used. In some embodiments, the NB-IoT UE may use 64 different data channels. The set of data channels is indexed with increasing frequency as $n_{hop}$=0, 1, . . . , $N_{MF\ NB-IoT}^{freq}$-1, where $n_{hop}$=0 represents the lowest hop frequency in the set of hopping frequencies.

In the above Detailed Description, various features may be grouped together to streamline the disclosure. However, the claims applicable to these features may not set forth every feature disclosed herein as embodiments may feature a subset of said features. Further, embodiments may include fewer features than those disclosed in a particular example.

What is claimed is:

1. An apparatus, comprising:
one or more processors arranged to cause a narrowband (NB) internet of things user equipment (NB-IoT UE) to:
decode, from a radio access network (RAN), control information in an anchor segment of an NB anchor channel in an unlicensed band, wherein the NB anchor channel is fixed over time, the control information including a downlink (DL)/uplink (UL) configuration for communication in data segments using only a plurality of NB data channels in the unlicensed band, wherein the NB anchor channel is at a different frequency than the plurality of NB data channels, wherein the NB anchor channel does not include a data segment, wherein the NB anchor channel includes narrow primary synchronization signal (NPSS), narrow secondary synchronization signal (NSSS), and physical broadcast channel (NPBCH), and wherein at least some of the control information is carried in the NPBCH and the anchor channel provides the NPSS and the NSSS for initial access by the NB-IoT UE; and
communicate data with the RAN in data segments on at least two of the plurality of NB data channels, wherein the at least two NB data channels for data communication are selected in accordance with frequency hopping information, wherein the DL/UL configuration is applied within a plurality of frequency hopping dwells during said communicating data, and wherein the DL/UL configuration is not applied to the anchor segment of the NB anchor channel.

2. The apparatus of claim 1, wherein the DL/UL configuration is provided in a Master Information Block (MIB).

3. The apparatus of claim 2, wherein the DL/UL configuration is indicated in at most 3 bits of the MIB.

4. The apparatus of claim 3, wherein the DL/UL configuration indicates at least half of subframes used to transmit in the NB data channels are UL subframes.

5. The apparatus of claim 3, wherein the DL/UL configuration is dependent on a geographic region in which the NB-IoT UE is disposed.

6. The apparatus of claim 1, wherein the control information is provided in data received in the NB anchor channel rather than being indicated in a downlink control information (DCI) format.

7. The apparatus of claim 1, wherein the control information comprises timing information used with the frequency hopping information for frequency hopping in 64 NB data channels.

8. The apparatus of claim 1, wherein the frequency hopping information is preconfigured prior to reception of the control information.

9. The apparatus of claim 1, wherein in a frame structure that comprises the anchor segment and the data segments, the anchor segment occurs at a beginning of the frame structure before the data segments.

10. The apparatus of claim 1, wherein the control information indicates whether frequency hopping is to be used.

11. The apparatus of claim 1, wherein the one or more processors are further configured to select the NB anchor channel from among a plurality of NB anchor channels in the unlicensed band.

12. The apparatus of claim 11, wherein at least one of:
each NB anchor channel is associated with a different set of the NB data channels, or
the DL and UL configurations of different NB anchor channels and associated set of the NB data channels are independent of each other.

13. The apparatus of claim 1, wherein:
the one or more processors comprise a baseband processor configured to encode transmissions to, and decode transmissions from, the RAN.

14. A method for operating a narrowband (NB) internet of things user equipment (NB-IoT UE), comprising:
by the NB-IoT UE:
selecting an NB anchor channel from among a plurality of NB anchor channels in the unlicensed band;
decoding, from a radio access network (RAN), control information in an anchor segment of the NB anchor channel in the unlicensed band, wherein the NB anchor channel is fixed over time, the control information including a downlink (DL)/uplink (UL) configuration for communication using a plurality of NB data channels in the unlicensed band, wherein the NB anchor channel is at a different frequency than the plurality of NB data channels, wherein the NB anchor channel does not include a data segment, wherein the NB anchor channel includes narrow primary synchronization signal (NPSS), narrow secondary synchronization signal (NSSS), and physical broadcast channel (NPBCH), and wherein at least one of each NB anchor channel is associated with a different set of the NB data channels or the DL and UL configurations of different NB anchor channels and associated set of the NB data channels are independent of each other; and
communicating data with the RAN in data segments on at least two of the plurality of NB data channels, wherein the at least two NB data channels for data communication are selected in accordance with frequency hopping information, wherein the DL/UL configuration is applied within a plurality of frequency hopping dwells during said communicating data, and wherein the DL/UL configuration is not applied to the anchor segment of the NB anchor channel.

15. The method of claim 14, wherein the control information is provided in data received in the NB anchor channel rather than being indicated in a downlink control information (DCI) format.

16. The method of claim 14,
wherein at least some of the control information is carried in the NPBCH and the anchor channel provides the NPSS and the NSSS for initial access by the NB-IoT UE.

17. The method of claim 14,
wherein the control information comprises timing information used with the frequency hopping information for frequency hopping in 64 NB data channels.

18. A non-transitory, computer accessible memory medium storing program instructions executable by a processor of a narrowband (NB) internet of things user equipment (NB-IoT UE) to:
decode, from a radio access network (RAN), control information in an anchor segment of an NB anchor channel in an unlicensed band, wherein the NB anchor channel is fixed over time, the control information including a downlink (DL)/uplink (UL) configuration for communication using a plurality of NB data channels in the unlicensed band, wherein the NB anchor channel is at a different frequency than the plurality of NB data channels, wherein the NB anchor channel does not include a data segment, wherein the NB anchor channel includes narrow primary synchronization signal (NPSS), narrow secondary synchronization signal (NSSS), and physical broadcast channel (NPBCH), and wherein at least some of the control information is carried in the NPBCH and the anchor channel provides the NPSS and the NSSS for initial access by the NB-IoT UE; and communicate data with the RAN in data segments on at least two of the plurality of NB data channels, wherein the at least two NB data channels for data communication are selected in accordance with frequency hopping information, wherein the DL/UL configuration is applied within a plurality of frequency hopping dwells during said communicating data, and wherein the DL/UL configuration is not applied to the anchor segment of the NB anchor channel.

19. The non-transitory, computer accessible memory medium of claim 18, wherein the control information is provided in data received in the NB anchor channel rather than being indicated in a downlink control information (DCI) format.

20. The non-transitory, computer accessible memory medium of claim 18, wherein at least one of:

each NB anchor channel is associated with a different set of the NB data channels, or the DL and UL configurations of different NB anchor channels and associated set of the NB data channels are independent of each other.

* * * * *